(12) United States Patent
Pabst et al.

(10) Patent No.: US 12,092,843 B2
(45) Date of Patent: Sep. 17, 2024

(54) METHOD FOR MANUFACTURING AN OPTICAL MICROLENS ARRAY

(71) Applicant: Fraunhofer-Gesellschaft zur Förderung der angewandten Forschung e.V., Munich (DE)

(72) Inventors: Oliver Pabst, Espoo (FI); Erik Beckert, Arnstadt (DE); Peter Dannberg, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 707 days.

(21) Appl. No.: 16/544,818

(22) Filed: Aug. 19, 2019

(65) Prior Publication Data
US 2019/0369296 A1 Dec. 5, 2019

Related U.S. Application Data

(63) Continuation of application No. PCT/EP2018/054609, filed on Feb. 26, 2018.

(30) Foreign Application Priority Data

Feb. 27, 2017 (DE) .......................... 102017203180.8

(51) Int. Cl.
*G02B 3/00* (2006.01)
*G02B 1/14* (2015.01)

(52) U.S. Cl.
CPC .............. *G02B 3/0031* (2013.01); *G02B 1/14* (2015.01)

(58) Field of Classification Search
CPC ........ B29D 11/00298; B29D 11/00365; G02B 1/14; G02B 3/0012; G02B 3/0031
See application file for complete search history.

(56) References Cited

U.S. PATENT DOCUMENTS

| 5,435,887 A | 7/1995 | Rothschild et al. |
| 5,498,444 A | 3/1996 | Hayes |

(Continued)

FOREIGN PATENT DOCUMENTS

| CN | 101672936 A | 3/2010 |
| CN | 203365711 U | 12/2013 |

(Continued)

OTHER PUBLICATIONS

Chinese Office Action, dated Dec. 14, 2020, in parallel patent application No. 201880025238.6.

(Continued)

*Primary Examiner* — Joseph P Martinez
*Assistant Examiner* — Vipin Patel
(74) *Attorney, Agent, or Firm* — McClure, Qualey & Rodack, LLP

(57) ABSTRACT

The invention relates to an optical microlens array and to a method for manufacturing an optical microlens arrays, wherein the method includes, among other things: providing a substrate having a first side and an opposite second side. The method further includes applying a photoresist to the first side of the substrate at least in portions, and structuring the photoresist such that the structured photoresist remains at predetermined locations on the first side of the substrate where one optical microlens each is to be later arranged. In addition, the method includes applying a hydrophobic coating to the first side of the substrate and subsequently removing the structured photoresist including the hydrophobic coating located thereon from the first side of the substrate. Furthermore, according to the invention, one microlens each is arranged on the spots of the first side of the substrate that are freed from the structured photoresist.

14 Claims, 18 Drawing Sheets

(56) References Cited

U.S. PATENT DOCUMENTS

| | | | |
|---|---|---|---|
| 6,618,201 B2 * | 9/2003 | Nishikawa | G02B 3/0018 359/620 |
| 2004/0257660 A1 | 12/2004 | Hasei | |
| 2005/0035474 A1 | 2/2005 | Itoh | |
| 2005/0052751 A1 | 3/2005 | Liu et al. | |
| 2005/0175846 A1 | 8/2005 | Mund et al. | |
| 2007/0217019 A1 | 9/2007 | Huang et al. | |
| 2007/0264424 A1 * | 11/2007 | Wang | B29D 11/00365 427/162 |
| 2008/0158683 A1 * | 7/2008 | Yun | B29D 11/00365 359/620 |
| 2010/0181691 A1 * | 7/2010 | Yoshida | G02B 13/0085 264/1.36 |
| 2010/0208354 A1 * | 8/2010 | Okazaki | B29D 11/00365 264/1.7 |
| 2012/0320466 A1 | 12/2012 | Hung et al. | |
| 2013/0040070 A1 | 2/2013 | Jung et al. | |
| 2016/0299263 A1 | 10/2016 | Zhou | |

FOREIGN PATENT DOCUMENTS

| | | | | |
|---|---|---|---|---|
| CN | 104503007 A | 4/2015 | | |
| DE | 10 2014 012 375 A1 | 2/2016 | | |
| DE | 10 2014 112 725 A1 | 3/2016 | | |
| KR | 10-0600525 B1 | 7/2006 | | |
| KR | 10-0875174 B1 | 12/2008 | | |
| WO | WO 02/084340 A1 * | 10/2002 | | G02B 3/0012 |

OTHER PUBLICATIONS

English Translation of Chinese Office Action, dated Dec. 14, 2020, in parallel patent application No. 201880025238.6.

First Written Opinion of IPEA dated Feb. 14, 2019, issued in application No. PCT/EP2018/054609.

International Search Report issued in application No. PCT/EP2018/054609.

Second Written Opinion of IPEA dated Jun. 4, 2019, issued in application No. PCT/EP2018/054609.

Jacot-Descombes, L., et al.; "Organic-inorganic-hybrid-polymer microlens arrays with tailored optical characteristics and multi-focal properties;" Optics Express 25366; vol. 23; No. 19; Jul. 2015; pp. 1-11.

Kim, J.Y., et al.; "Hybrid polymer microlens arrays with high numerical apertures fabricated using simple ink-jet printing technique;" Optical Materials Express; vol. 1; Issue 2; May 2011; pp. 259-269.

Korean Office Action dated Oct. 14, 2020, in patent application No. 10-2019-7027765 with English translation.

* cited by examiner

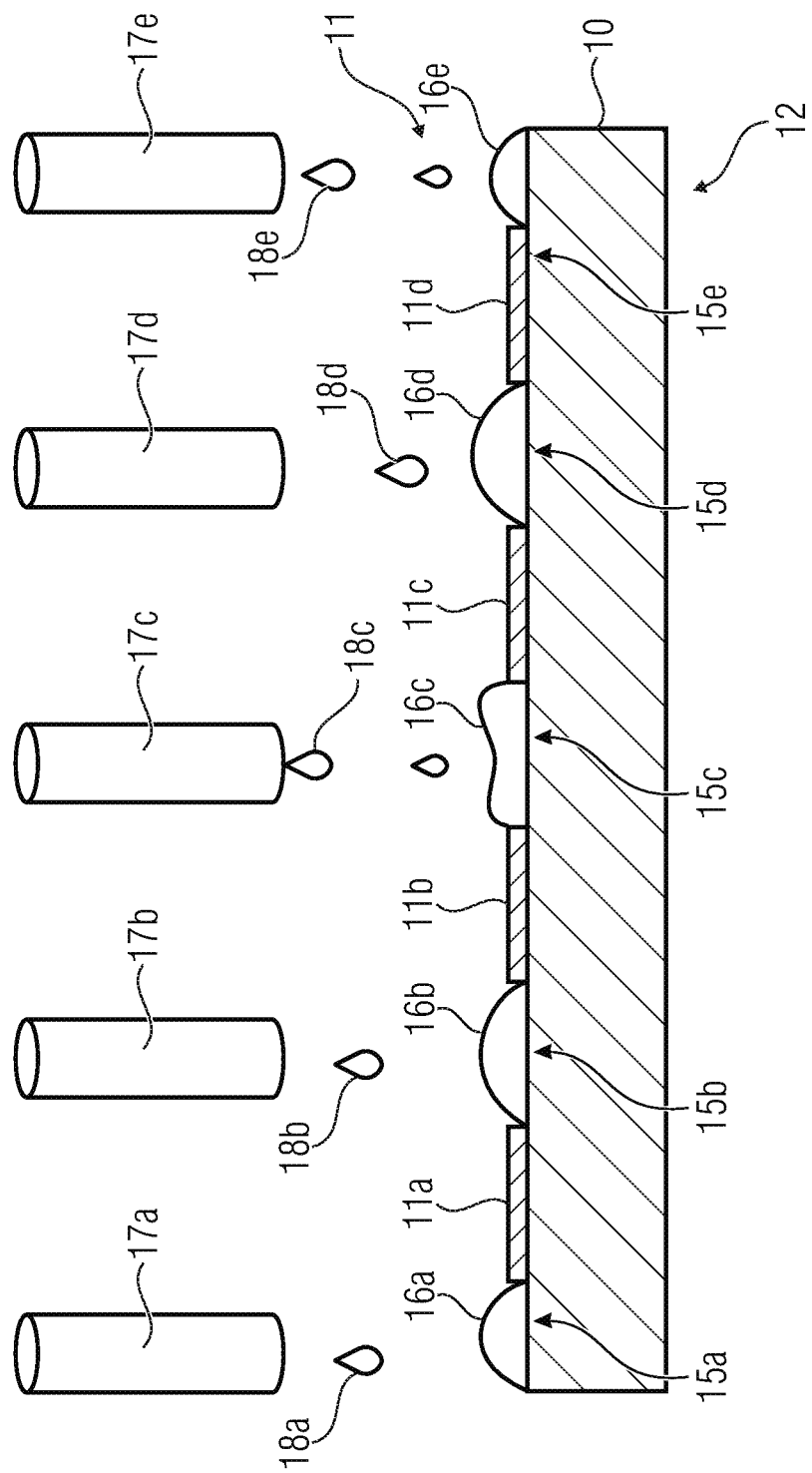

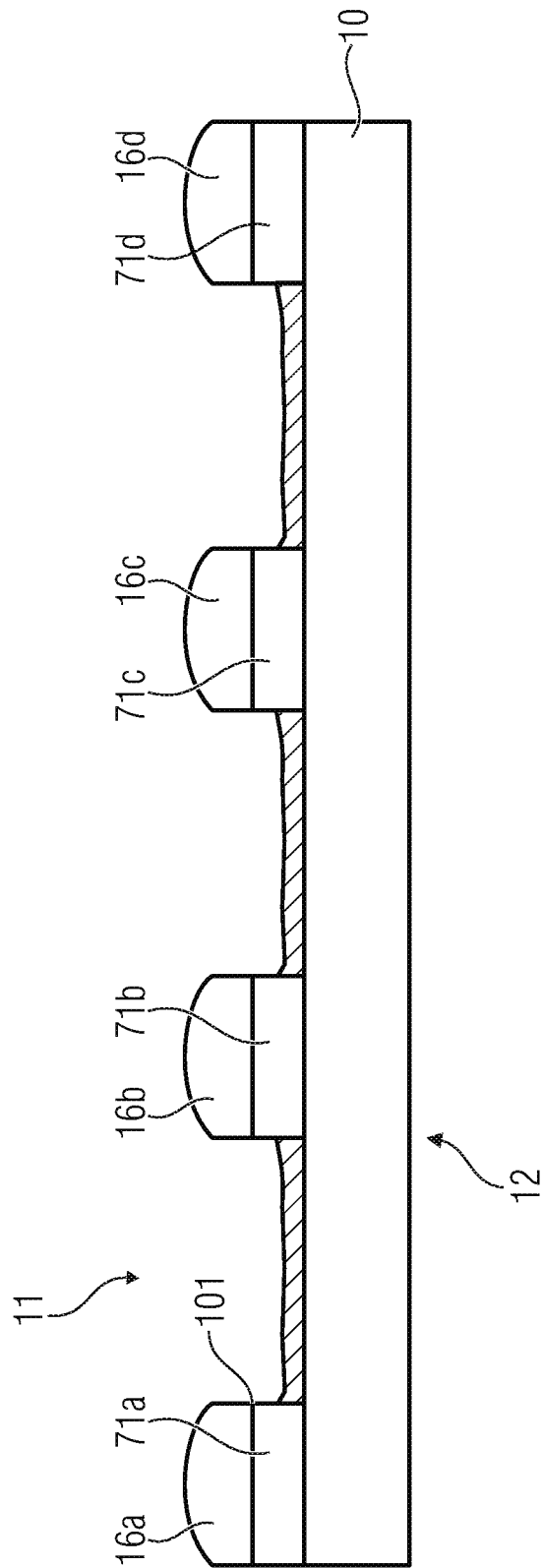

METHOD FOR MANUFACTURING AN OPTICAL MICROLENS ARRAY

CROSS-REFERENCES TO RELATED APPLICATIONS

This application is a continuation of copending International Application No. PCT/EP2018/054609, filed Feb. 26, 2018, which is incorporated herein by reference in its entirety, and additionally claims priority from German Applications No. DE102017203180.8, filed Feb. 27, 2017, which is incorporated herein by reference in its entirety.

BACKGROUND OF THE INVENTION

The invention concerns a method for manufacturing an optical microlens array, wherein the method comprises of all features of claim 1. The invention further concerns an optical microlens array that may be manufactured by means of the above-said method, wherein the microlens array comprises all features of accompanying claims.

Microlens arrays comprise a multitude of individual microlenses. Such microlens arrays comprise significant advantages over conventional macrolenses. For example, the installation space involved for the microlenses and/or the microlens array in a device may be significantly reduced compared to conventional macrolenses.

For example, such microlens arrays are used in projectors, wherein the overall installation size of these projectors may be significantly smaller than that of conventional projectors. A further advantage is that a significantly higher depth of field may be achieved in imaging and/or projection by means of the multitude of individual microlenses compared to conventional projectors with a single macrolens.

However, the manufacturing methods for such microlens arrays are very complex. For example, U.S. Pat. No. 5,498,444 A1 describes a method for inkjet printing of microlenses. Here, a substrate with a non-wetting coating is provided. The inkjet print heads need to be precisely aligned to non-coated spots. For this purpose, the Reference proposes the use of a precise visual system. However, this makes manufacturing of microlenses complex and expensive.

SUMMARY

According to an embodiment, a method for manufacturing an optical microlens arrays may have the steps of: providing a substrate comprising a first side and an opposite second side, applying a photoresist to the first side of the substrate at least in portions, wherein, before applying the photoresist on the first side of the substrate, three-dimensional protrusions projecting over the respective substrate surface of the first side of the substrate are provided, and wherein these projecting three-dimensional protrusions are provided at predetermined locations where the one optical microlens each is to be later arranged, wherein applying the photoresist comprises applying the photoresist to the projecting three-dimensional protrusions, structuring the photoresist such that the structured photoresist remains at the predetermined locations on the first side of the substrate where one optical microlens each is to be later arranged, applying a hydrophobic coating to the first side of the substrate, wherein applying the hydrophobic coating comprises applying the hydrophobic coating to the projecting three-dimensional protrusions, and subsequently removing the structured photoresist comprising the hydrophobic coating located thereon from the projecting three-dimensional protrusions, and arranging one microlens each on the spots of the first side of the substrate that are freed from the structured photoresist.

According to another embodiment, a microlens array may have: a substrate that is translucent at least in portions and comprises a first side and an opposite second side, wherein, on the first and/or the second side of the substrate, a respective multitude of three-dimensional protrusions projecting over the respective substrate surface of the first or second side of the substrate is arranged, wherein one microlens is arranged on each of the surfaces of the three-dimensional protrusions that are spaced apart from the substrate, and wherein a hydrophobic coating is located between the three-dimensional protrusions on the first and/or second side substrate, respectively.

In the method according to the invention, a substrate having a first side and an opposite second side is provided. Microlenses that together form the later microlens array are to be arranged at least on the first side of the substrate. In order to ensure a desired arrangement of the individual microlenses with respect to each other within the array, the individual lenses are to be arranged at predefined locations on the first side of the substrate. I.e., these are predefined locations on the first side of the substrate where one optical microlens each is to be later arranged. In addition, the same also applies for the second side of the substrate. According to the inventive method, a photoresist is applied to the first side of the substrate at least in portions, this photoresist being structured such that the structured photoresist remains at locations on the first side of the substrate where one optical microlens each is to be later arranged. Then, a hydrophobic coating is applied to the first side of the substrate. Thus, the hydrophobic coating covers the first side of the substrate at least in portions, but advantageously completely. This means that the structured photoresist located on the first side of the substrate as well as the remaining surface of the substrate are then covered with the hydrophobic layer. Subsequently, the structured photoresist including the hydrophobic coating located thereon is then removed from the first side of the substrate. Subsequently, one microlens each is arranged on the spots of the first side of the substrate that are freed from the structured photoresist. An advantage of the method according to the invention is that the hydrophobic coating hydrophobizes the first side of the substrate with the exception of the spots where the photoresist was located. When removing the structured photoresist, the hydrophobic coating located on the photo resist is removed together with the same. With this, the substrate located underneath the structured photoresist is exposed once again. If the substrate comprises hydrophilic characteristics, due to removing the photoresist, there are hydrophilic spots on the substrate that are surrounded by the hydrophobic layer. One microlens each may then be arranged on these hydrophilic spots.

A microlens array according to the invention may be manufactured with this inventive method. Such an inventive microlens array comprises, among other things, a substrate that is translucent at least in portions and comprises a first side and an opposite second side. On the first and/or the second side of the substrate, the same comprises a multitude of three-dimensional protrusions that project over the respective substrates surface of the first or second side of the substrate. For example, these three-dimensional protrusions comprise a shape reminiscent of pedestals or flat columns. The three-dimensional protrusions extend on the first and/or the second side of the substrate away from the respective substrate surface. The top side of the three-dimensional protrusions furthest away from the substrate surface comprises a surface that may be flattened and may be arranged in parallel to the substrate surface. According to the invention, one microlens is arranged on each one of these surfaces of the three-dimensional protrusions that are spaced apart from the substrate. As described above with respect to the method, an inventive microlens array may be recognized after its manufacturing by the fact that a hydrophobic coating is respectively located between the three dimensional protrusions on the first and/or the second side of the substrate.

BRIEF DESCRIPTION OF THE DRAWINGS

Embodiments of the present invention will be detailed subsequently referring to the ap-pended drawings, in which:

FIG. 1G shows another side view of the substrate according to a further process step of the inventive method, FIG. 10 shows a side view of an inventive microlens array.

DETAILED DESCRIPTION OF THE INVENTION

Figure 1A:
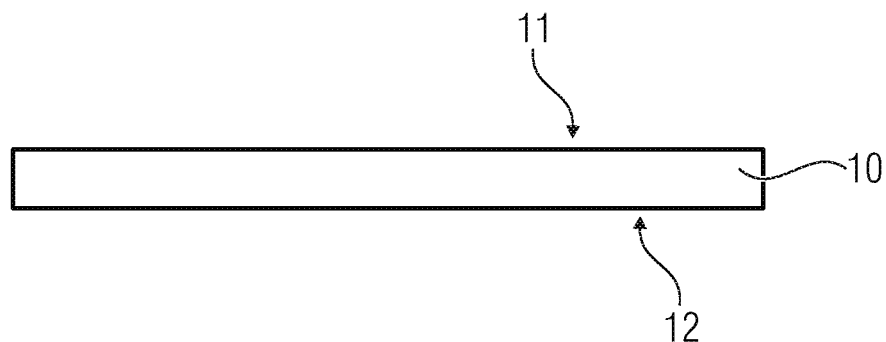
FIG. 1A shows a side view of a substrate for manufacturing a microlens array using the invention method.

The following describes an embodiment of the invention with reference to the figures in more detail, wherein elements with the same or a similar function are provided with the same reference numerals.

FIGS. 1A to 1G show individual steps of the inventive method for manufacturing a microlens array.

First, in FIG. 1A, a substrate 10 is provided. The substrate 10 comprises a first side 11 and an opposite second side 12. For example, the substrate 10 may be translucent and/or transparent at least in portions. For example, the substrate 10 may be manufactured from glass, silicone, $SiO_2$, or transparent and/or partially transparent polymers.

Figure 1B:
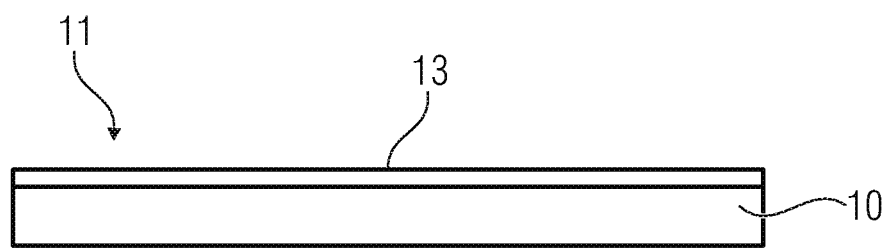
FIG. 1B shows another side view of the substrate according to a further process step of the inventive method.

In FIG. 1B, a photoresist 13 is applied to the first side 11 of the substrate 10 at least in portions.

Figure 1C:
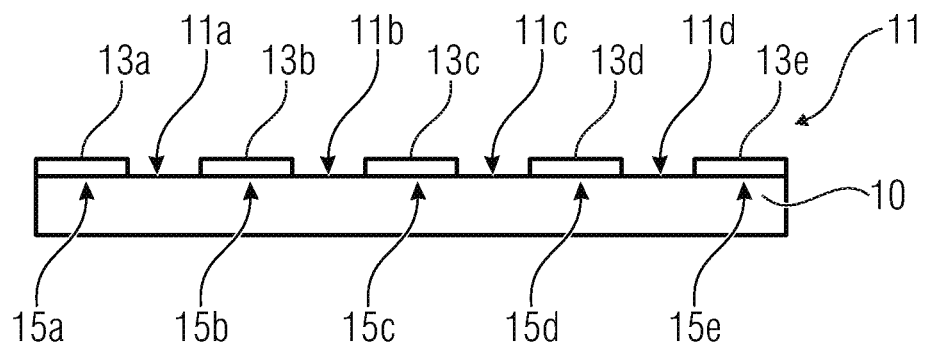
FIG. 1C shows another side view of the substrate according to a further process step of the inventive method.

In FIG. 1C, the photoresist 13 is structured by means of common methods. Here, the photoresist 13 is structured such that the structured photoresist 13a-13e remains at locations 15a-15e (FIG. 1G) on the first side 11 of the substrate 10 where one optical microlens 16a-16e (FIG. 1G) each is to be later arranged. In other words, during the step of structuring, the photoresist 13 is removed at locations 11a-11d where no optical microlenses 16a-16b are to be later arranged. Thus, the spots of the first side 11 of the substrate 10 that are indicated with reference numerals 11a-11d in FIG. 1C are exposed.

As mentioned above, the positions of the individual microlenses of a microlens array are known in advance. In order to ensure the desired arrangement and/or positioning of the individual microlenses with respect to each other within the array, the individual microlenses are to be arranged at these known and/or predefined locations 15a-15e on the first side 11 of the substrate 10. Thus, these are predefined locations 15a-15e on the first side 11 of the substrate 10 where one optical microlens 16a-16e each is to be later arranged.

As can be seen in FIG. 1C, individual microlenses are arranged at the locations 15a-15e on the first side 11 of the substrate 10 where the structured photoresist 13a-13e is located in this method step.

Figure 1D:
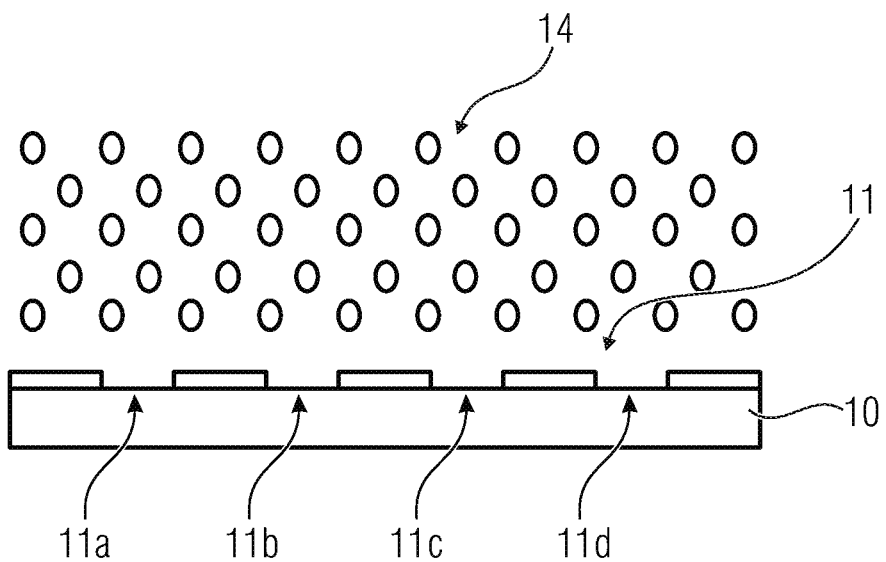
FIG. 1D shows another side view of the substrate according to a further process step of the inventive method.

FIG. 1D shows a further method step. Here, a hydrophobic coating 14 is applied to the first side 11 of the substrate 10. For example, the hydrophobic coating 14 may be applied to the first side 11 of the substrate 10 in the gas phase or in the liquid phase. Thus, coating is only exemplarily illustrated in FIG. 1D based on the depicted droplets. For example, silane may be used as an appropriate means for hydrophobization.

The substrate 10, or the first side 11 of the substrate 10, may be coated in a global manner, i.e., the entire surface of the first side 11 of the substrate 10 is coated. However, it is also conceivable that the first side 11 of the substrate 10 is only locally coated. In this case, only the spots 11a-11d freed from the photoresist 13 could be coated.

Figure 1E:
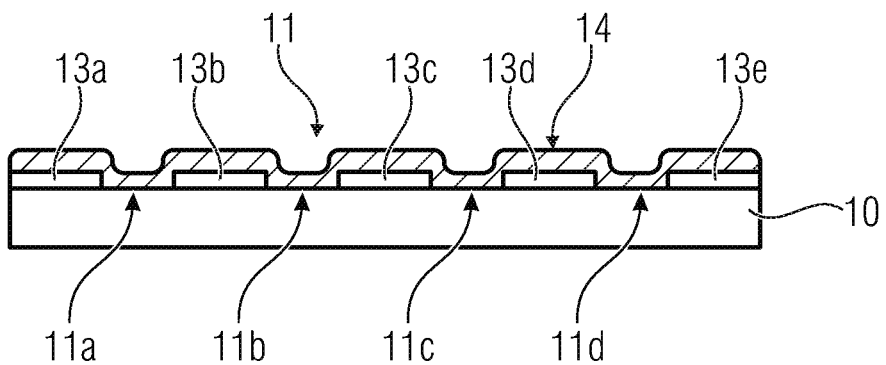
FIG. 1E shows another side view of the substrate according to a further process step of the inventive method.

FIG. 1E shows the result of coating with the hydrophobic coating 14. It can be seen that the hydrophobic coating 14 is deposited in the form of a thin film on the first side 11 of the substrate 10, i.e., on the remaining photoresist 13a-13e and in the gaps 11a-11d. In order to highlight the hydrophobic layer 14 with respect to the remaining structures, the hydrophobic layer 14 is marked with dashed lines.

Figure 1F:
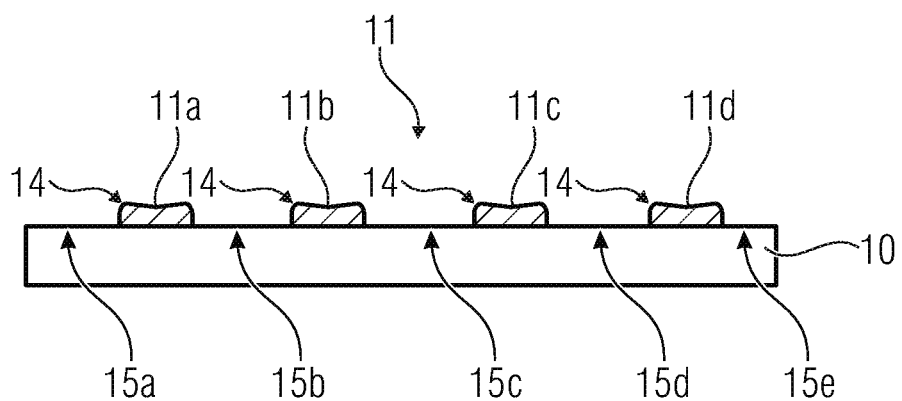
FIG. 1F shows another side view of the substrate according to a further process step of the inventive method.

After applying the hydrophobic coating 14, the hydrophobic coating 14 is partially removed from the first side 11 of the substrate 10. As can be seen in FIG. 1F, the structured photoresist 13a-13e including the hydrophobic coating 14 located thereon is removed from the first side 11 of the substrate 10.

Thus, only the spots 11a-11d that were previously not covered with the photoresist 13 remain covered with the hydrophobic coating 14 on the first side 11 of the substrate 10. In other words, the hydrophobic coating 14 forms a negative with respect to the structured photoresist 13a-13e from FIGS. 1C-1E.

On the other hand, the spots 15a-15e that were covered with the photoresist 13a-13e are now exposed. In the embodiment shown here, these are the exposed spots 15a-15e of the substrate surface. If the substrate surface comprises hydrophilic characteristics, the exposed spots 15a-15e are also hydrophilic.

That is, although the first side 11 of the substrate 10 was previously coated with the hydrophobic layer 14 over a large part of the surface, hydrophilic spots 15a-15e on the first side 11 of the substrate 10 are obtained by removing the photoresist 13a-13e.

FIG. 1F shows a further step of the inventive method. Here, one microlens 16a-16e each is arranged on the spots 15a-15e of the first side 11 of the substrate 10 that are freed from the structured photoresist 13a-13e. As mentioned above, the spots 15a-15e that are freed from the photoresist 13a-13e may comprise hydrophilic characteristics.

For example, this may be advantageous if the microlenses 16a-16e are printed. For this, for example, an optical inkjet printing method may be used, as is exemplarily shown in FIG. 1G. Several nozzles 17a-17e of an inkjet print system eject individual drops 18a-18e of an optical material, e.g., translucent polymers. The drops collecting on the first side 11 of the substrate 10 then form a microlens 16a-16e each.

In this case, the individual nozzles 17a-17e do not have to be exactly aligned. The alignment of the nozzles 17a-17e with respect to the spots 15a-15e freed from the photoresist 13a-13e may be carried out with relatively large tolerances. If the ejected drops 18a-18e should fall on edge areas of the hydrophobic coating 11a-11d, they will roll off there and land in the spots 15a-15e freed from the photoresist 13a-13e.

Figure 2:
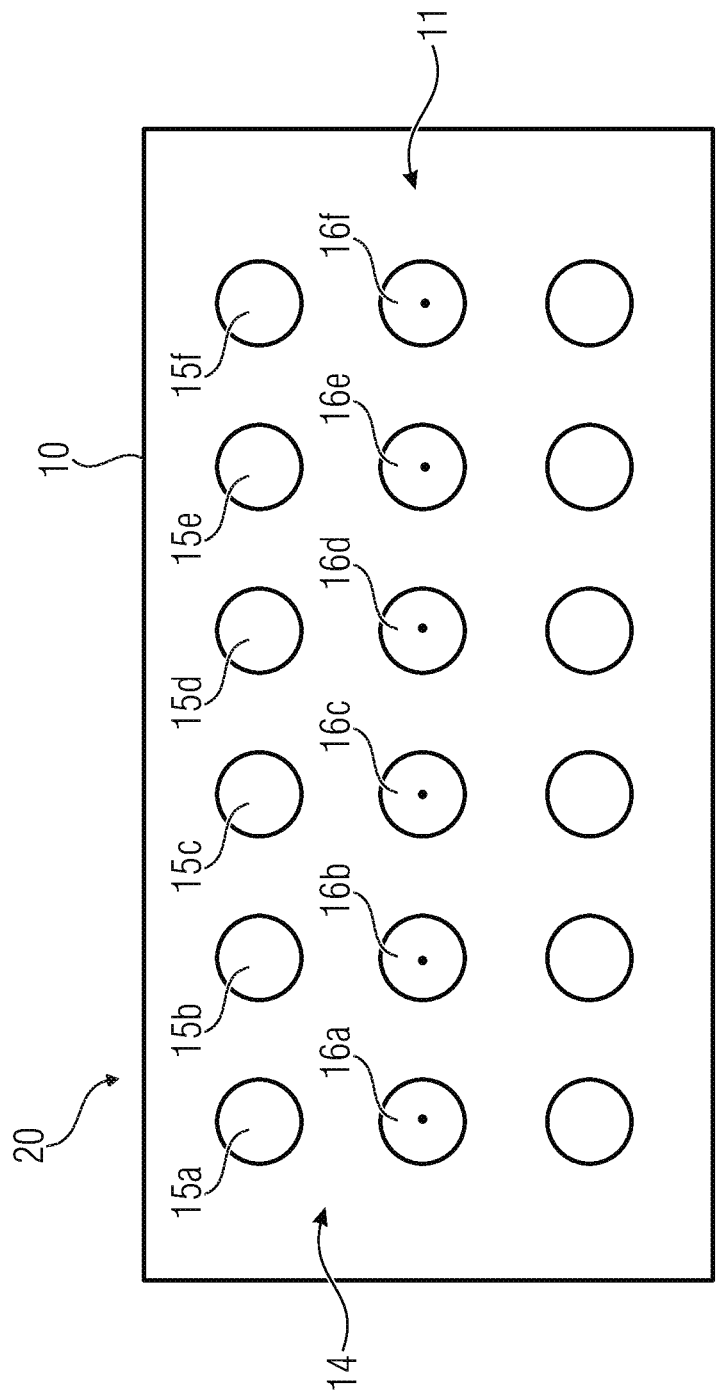
FIG. 2 shows a top view of an inventive microlens array.

To illustrate the hydrophobic coating 14 and the spots 15a-15e freed from the photoresist 13a-13e, FIG. 2 shows a top view of an inventive microlens array 20 that was manufactured with the method according to the invention.

The first side 11 of the substrate 10 can be seen, wherein the first side 11 of the substrate 10 is almost entirely coated with the hydrophobic layer 14. The spots 15a-15f freed from the photoresist 13a-13f mark the locations at which the microlenses 16a-16f are to be arranged. As initially mentioned, the structured photoresist 13a-13f is removed together with the hydrophobic coating 14 located thereon. Thus, the spots 15a-15f freed from the photoresist 13a-13f do not comprise any hydrophobic coating 14 either.

Thus, with the exception of the spots 15a-15f freed from the photoresist 13a-13f, the first side 11 of the substrate 10 is coated with the hydrophobic coating 14. In the center row depicted in FIG. 2, the microlenses 16a-16f have already been arranged. For example, these may have been printed by means of the above-described inkjet printing method on the first side 11 of the substrate 10.

The method mentioned with respect to FIGS. 1A to 1G may also be performed such that the second side 12 of the substrate 10 is accordingly processed instead of the first side 11 described above.

According to a further conceivable embodiment, both the first side 11 and also the second side 12 of the substrate 10 may be processed. This is subsequently described with reference to FIGS. 3A to 3G.

Figure 3A:
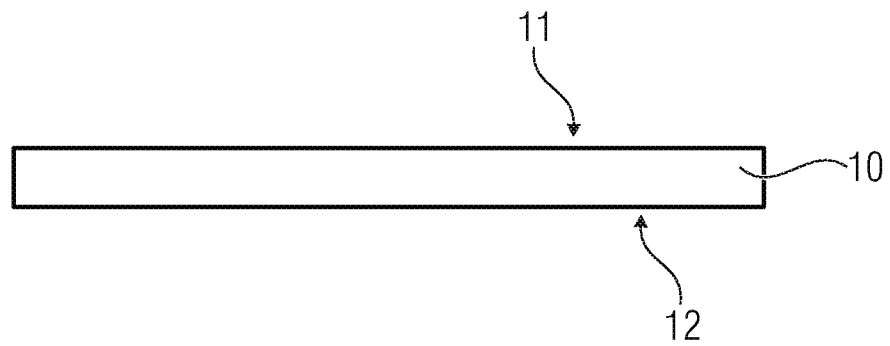
FIG. 3A shows a side view of a substrate for manufacturing a microlens array using another embodiment of the inventive method.

As can be seen in FIG. 3A, a substrate 10 having a first side 11 and an opposite second side 12 is first again provided.

Figure 3B:
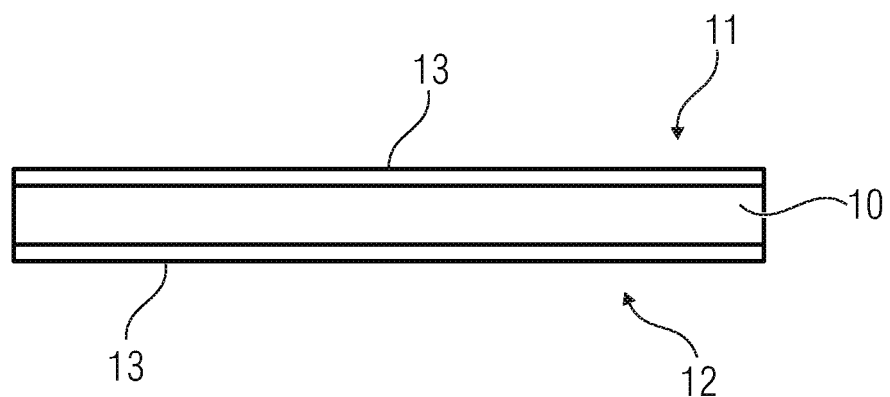
FIG. 3B shows another side view of the substrate according to a further process step of the inventive method.

Then, in FIG. 3B, the photoresist 13 is applied to the first side 11 and the second side 12 of the substrate 10 at least in portions.

Figure 3C:
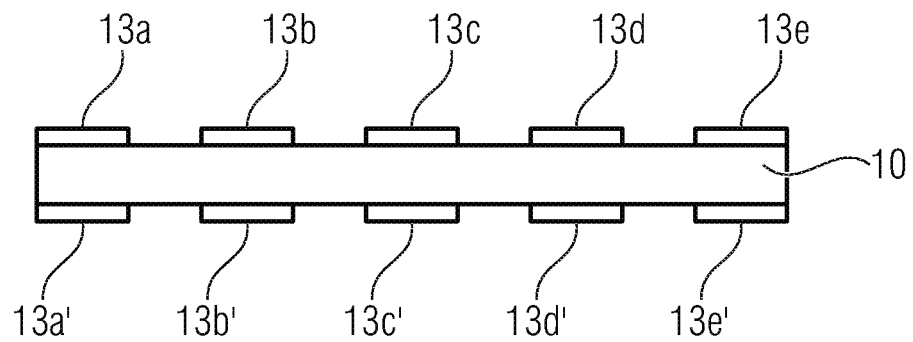
FIG. 3C shows another side view of the substrate according to a further process step of the inventive method.

In FIG. 3C, the photoresist 13 is structured, again such that the structured photoresist 13a'-13e' remains at locations on the second side 12 of the substrate 10 where one microlens each is to be later arranged.

Figure 3D:
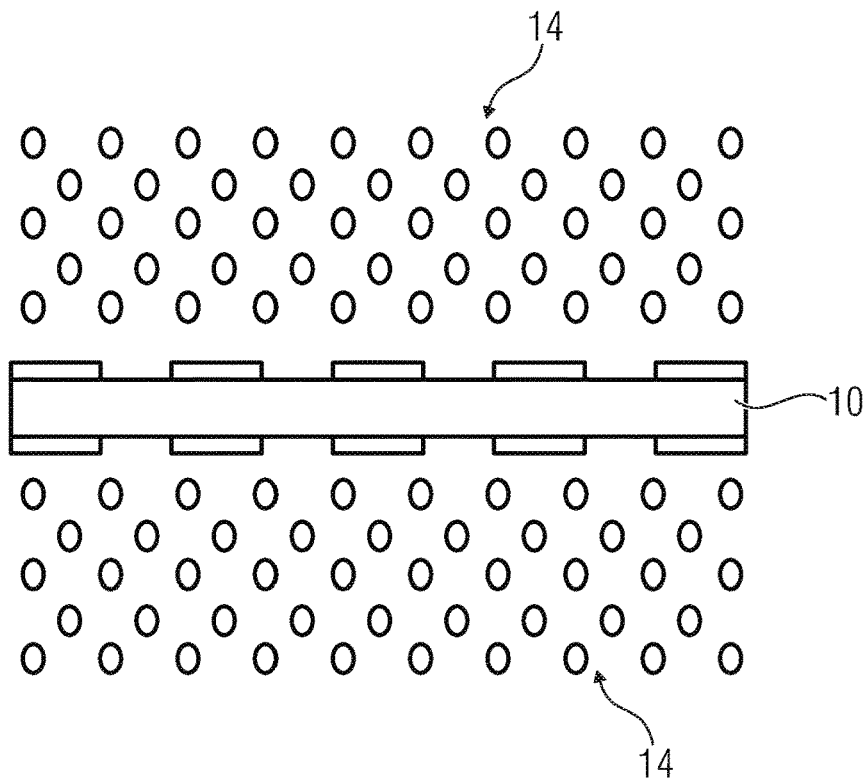
FIG. 3D shows another side view of the substrate according to a further process step of the inventive method.
Figure 3E:
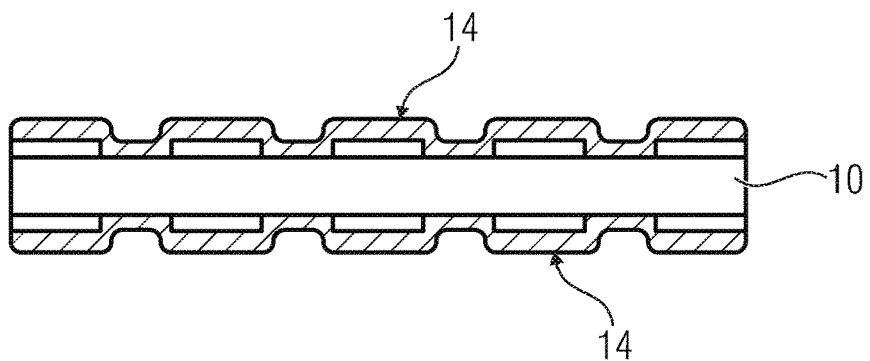
FIG. 3E shows another side view of the substrate according to a further process step of the inventive method.

In FIG. 3D, the hydrophobic coating 14 is applied to the first side 11 and the second side 12 of the substrate 10. The result of the coating process can again be seen in FIG. 3E. Here, the hydrophobic coating 14 is located in the form of a thin layer both on the first side 11 and the second side 12 of the substrate 10.

Figure 3F:
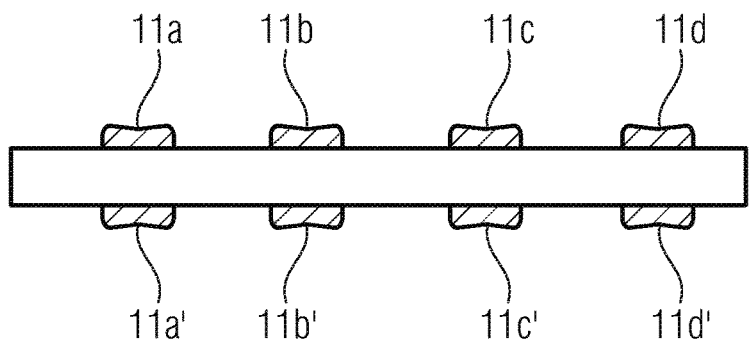
FIG. 3F shows another side view of the substrate according to a further process step of the inventive method.

As can be seen in FIG. 3F, the structured photoresist 13a-13e on the first side 11 of the substrate 10 and the structured photoresist 13a'-13e' on the second side 12 of the substrate 10 respectively including the hydrophobic coating 14 located thereon are removed from the first and second sides 11, 12 of the substrate 10, respectively.

Thus, the hydrophobic coating 14 remains at the locations 11a-11d, 11a'-11d' where microlenses are not intended to be on the later microlens array.

Figure 3G:
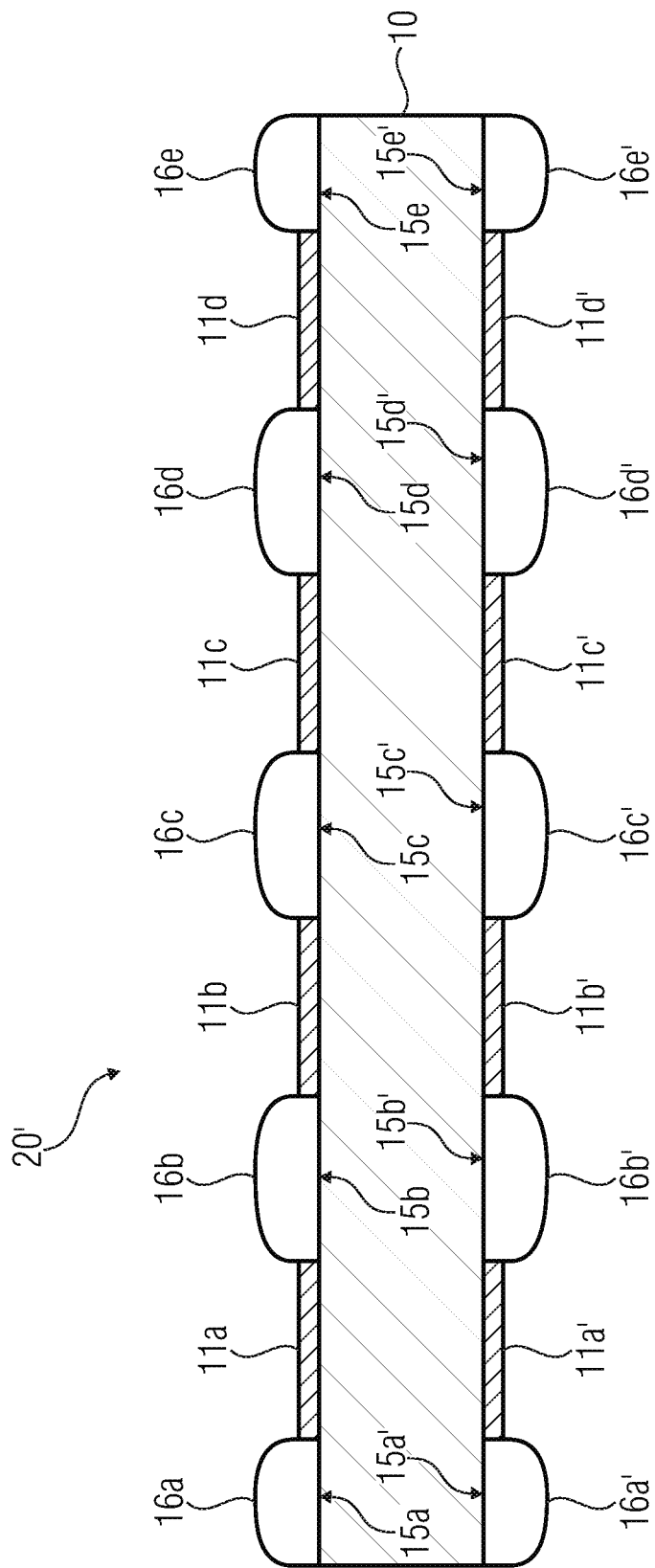
FIG. 3G shows another side view of the substrate according to a further process step of the inventive method.

FIG. 3G shows the finished microlens array 20' having microlenses 16a-16e, 16a'-16e' arranged on both sides 11, 12 of the substrate 10. According to the inventive method, one microlens each is arranged on the spots 15a-15e, 15a'-15e' of the first side 11 and the second side 12 of the substrate 10 that are freed from the structured photoresist 13a-13e, 13a'-13e'.

The previously applied hydrophobic coating 14 remains in the gaps 11a-11d between the individual microlenses 16a-16e on the first side 11 of the substrate 10 as well as in the gaps 11a'-11d' between the individual microlenses 16a'-16e' on the second side 11 of the substrate 10.

An embodiment provides combining the inventive microlens array 20, 20' with slides, i.e., shadow masks that may be backlit.

Figure 4:
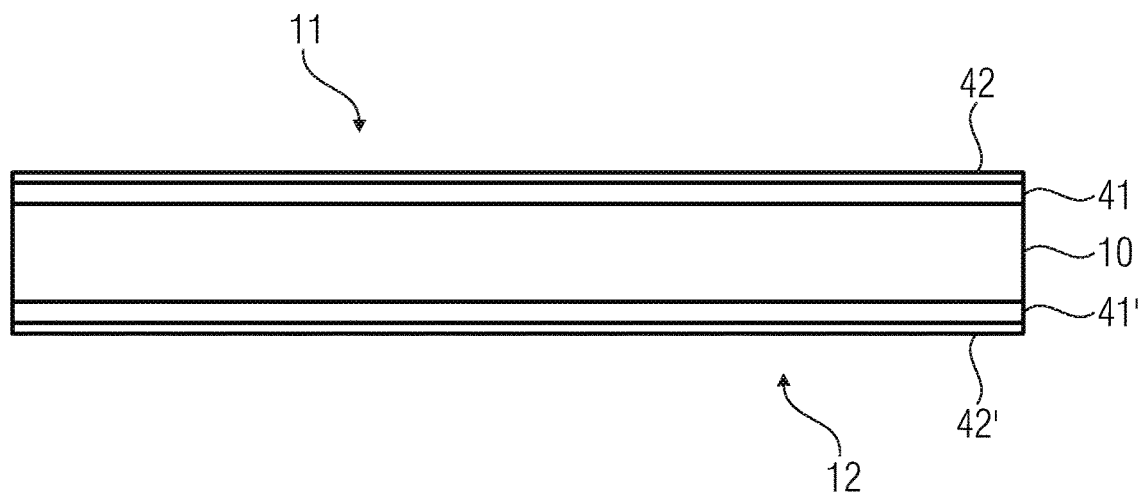
FIG. 4 shows a side view of a substrate for manufacturing a microlens array using another embodiment of the inventive method.

Such an embodiment is shown in FIG. 4. According to the invention, a metal layer 41, 41' is arranged on the first or the second side 11, 12 of the substrate 10 before applying the photoresist. A further layer of a translucent material 42, 42' is arranged on this metal layer 41, 41'. For example, this may be a SiO$_2$ layer 42, 42'.

After arranging the further translucent layer 42, 42', e.g., SiO$_2$ layer, the photoresist 13, 13' is then applied to this further layer 42, 42'. The method then essentially continues as described with respect to FIGS. 1B to 1G, but with the difference that the metal layer 41, 41' and the further translucent layer 42, 42' are located between the substrate 10 and the photoresist 13.

Figure 5:
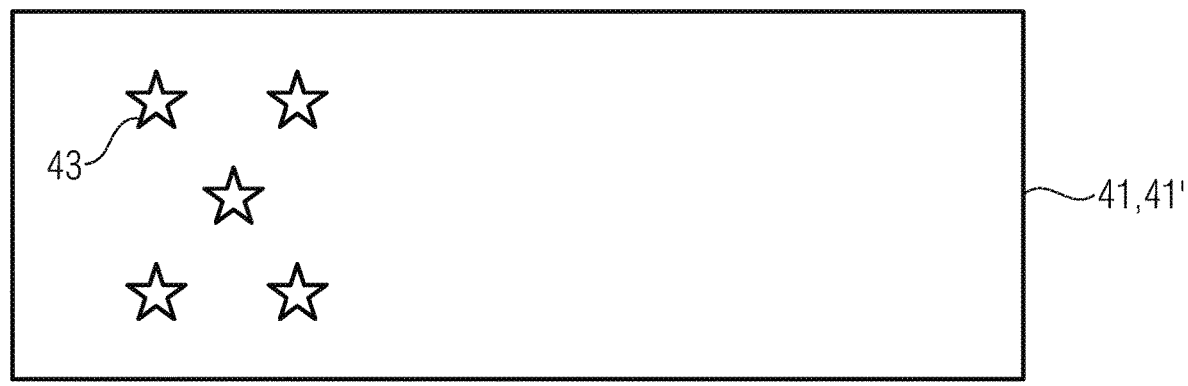
FIG. 5 shows a top view of a structured metal layer for forming slides.

As is shown in FIG. 5, the metal layer 41, 41' may optionally be structured. Structuring the metal layer 41, 41' may be carried out before attaching the same onto the substrate 10, or the metal layer 41, 41' may be directly structured on the substrate 10. Alternatively, the metal layer 41, 41' may be structured in advance and may be delivered as a structured part and be attached on the substrate 10. However, structuring the metal layer 41, 41' is carried out after the metal layer 41, 41' has been applied to the substrate 10.

In the sense of the present disclosure, the term "structuring" is understood to be manufacturing the initially-mentioned slides. These slides may also be referred to as shadow masks that may be backlit. FIG. 5 exemplarily shows such a slide 43 in the form of stars. Each star forms a respective slide 43. Obviously, the present invention is not restricted to the exemplarily illustrated stars. Rather, such a slide 43 may be present in any shape.

For example, a slide 43 may be manufactured by forming an accordingly shaped recess in the metal layer 41, 41'. That is, the metal layer 41, 41' comprises a material-free zone at this spot so that light may shine through this recess, or material-free zone.

According to the invention, structuring the metal layer 41, 41' includes partially and locally removing the layer 41, 41' so that a structure 43 that may be backlit is provided in the metal layer 41, 41'.

Figure 6:
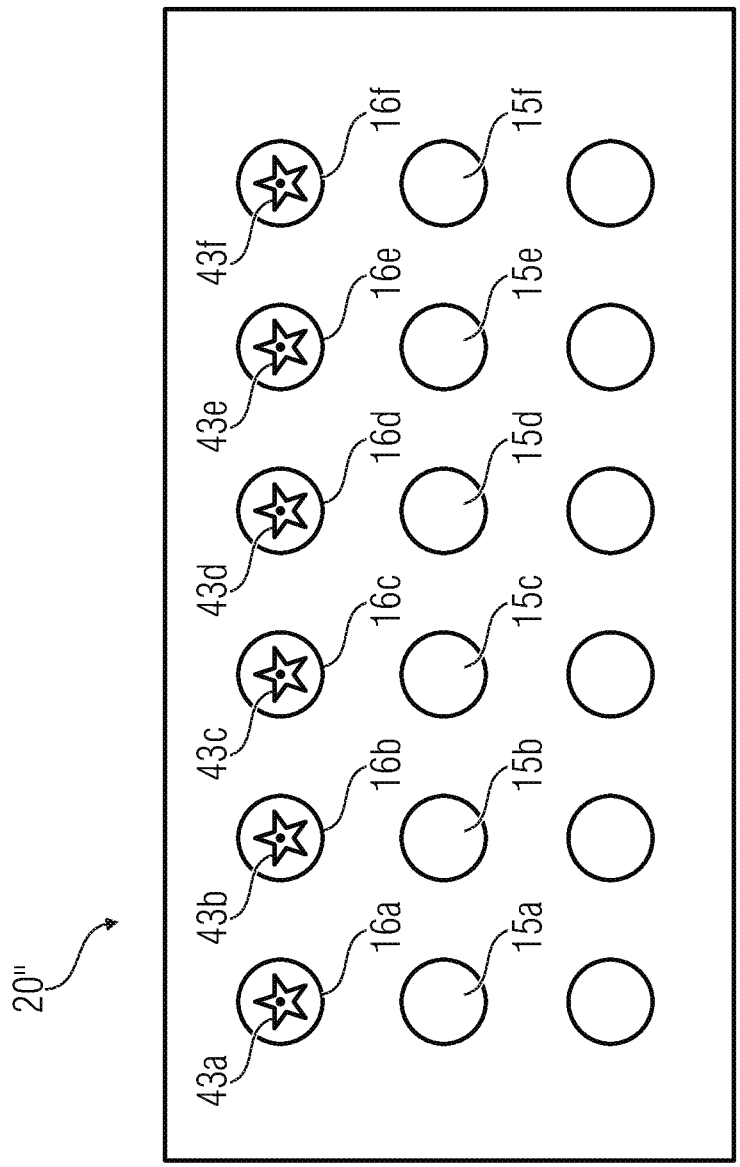
FIG. 6 shows a top view of an inventive microlens array according to an embodiment of the invention.

FIG. 6 shows a top view of an inventive microlens array 20''. This microlens array 20'' may be compared to the microlens array 20 depicted in FIG. 2, but with the difference that the above-described slides 43 are additionally present here.

In this case, the slides 43a-43f overlap with the individual microlenses 16a-16f along the optical axis. That is, each slide 43a-43f is assigned to an individual microlens 16a-16f. In other words, the microlenses 16a-16f and the slides 43a-43f are arranged above one another to be flush or congruent along an optical path.

For this, it is advantageous if the slides 43a-43f are arranged on the first and second sides 11, 12 of the substrate 10, respectively, such that the slides 43a-43f are located at the predetermined locations 15a-15f where one optical microlens 16a-16f each of the microlens array 20'' is to be later arranged.

Thus, according to the invention, the metal layer 41, 41' is arranged on the substrate 10 such that the structured part 43a-43f of the metal layer 41, 41' is located at the predetermined locations 15a-15f on the first side 11 or the second side 12 of the substrate 10 where one microlens 16a-16f each is to be later arranged.

Figure 7:
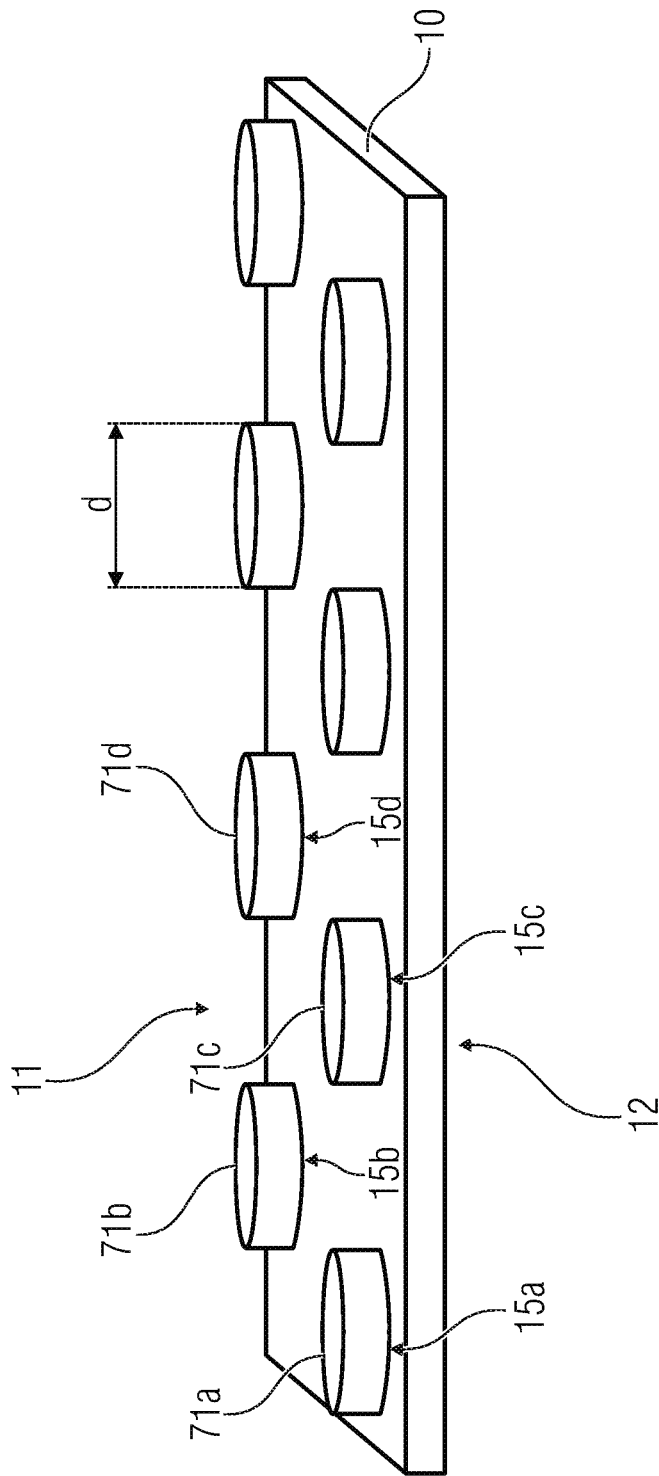
FIG. 7 shows a perspective view of a substrate for an inventive microlens array according to an embodiment of the invention.

FIG. 7 shows a further method step according to an embodiment of the inventive method. FIG. 7 illustrates a perspective view of a substrate 10 having a first side 11 and an opposite second side 12.

At least one three-dimensional protrusion 71a is arranged on the first side 11 of the substrate 10. These three-dimensional protrusions 71a-71d may also be arranged on the second side 12 of the substrate 10, or on both sides 11, 12 of the substrate 10.

Figure 8:
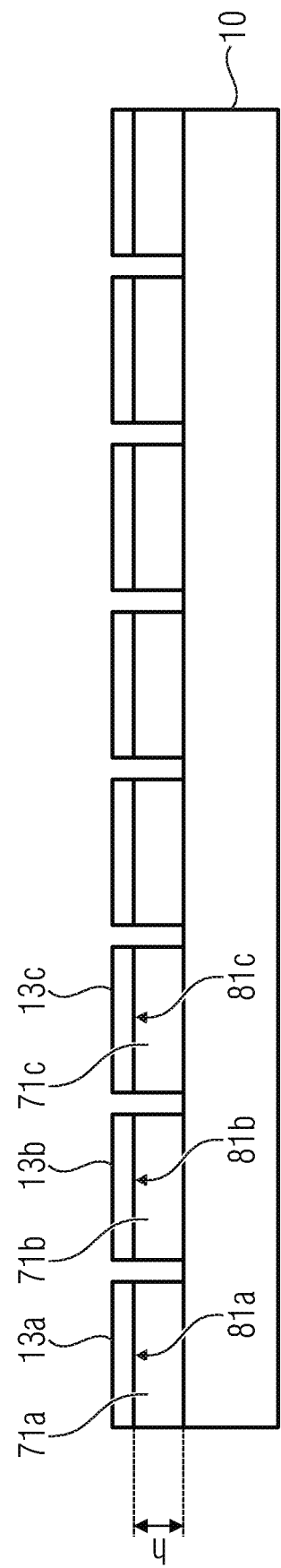
FIG. 8 shows a side view of this substrate.

The three-dimensional protrusions 71a-71d protrude with respect to the surface of the first side 11 of the substrate 10. According to an embodiment of the invention, the three-dimensional protrusions 71a-71d may comprise a height h between 50 nm and 5 μm (FIG. 8).

As is exemplarily shown in FIG. 7, the three-dimensional protrusions 71a-71d may also be configured as cylindrical pedestals. The cylindrical pedestals 71a-71d may comprise a diameter d between 50 μm and 2 mm. Alternatively or additionally, the three-dimensional protrusions 71a-71d may be transparent. Transparent three-dimensional protrusions 71a-71d may be manufactured from $SiO_2$, for example.

Later, the individual microlenses are arranged on the three-dimensional protrusions, or pedestals, 71a-71d. That is why it is advantageous if the three-dimensional protrusions, or pedestals, 71a-71d are provided at the predetermined locations 15a-15d where the individual optical microlenses are to be later arranged.

According to the invention, in this embodiment, three-dimensional protrusions 71a-71d projecting over the respective substrate surface of the first or second side 11, 12 of the substrate 10 are provided on the first side 11 and/or the second side 12 of the substrate 10 before applying the photoresist 13, wherein these projecting three-dimensional protrusions 71a-71d are provided at the predetermined locations 15a-15d where the one optical microlens each is to be later arranged.

FIG. 8 shows a further method step of this embodiment. It can be seen that the photoresist 13a-13c is applied on the respective top side 81a-81c of the three-dimensional protrusions 71a-71c. The top side 81a-81c of the three-dimensional protrusions 71a-71c is understood to be the side that is spaced apart from the substrate surface.

Thus, according to the invention, the step of applying the photoresist 13 includes that the photoresist 13a-13c is applied to the projecting three-dimensional protrusions 71a-71c. Obviously, this does not exclude that the photoresist 13 may also be deposited in the gaps between the three dimensional protrusions 71a-71c on the first and/or second side 11, 12 of the substrate 10, however, which is not illustrated in more detail for the sake of simplicity.

Figure 9:
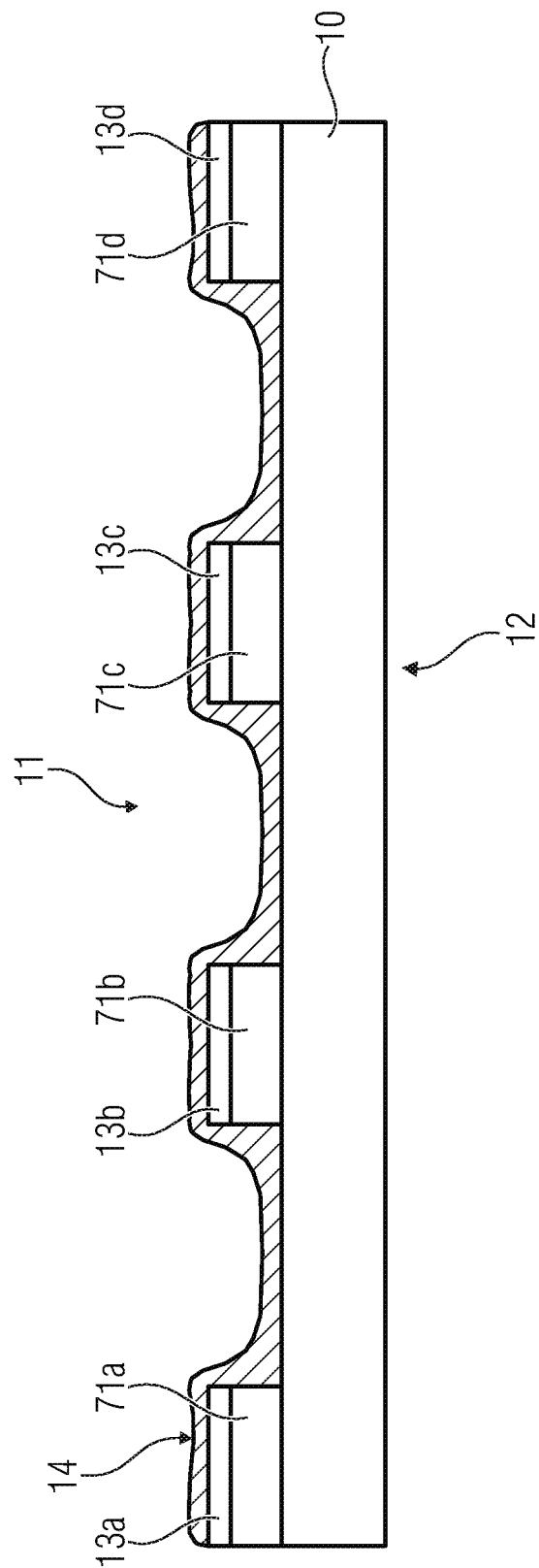
FIG. 9 shows another side view of this substrate.

FIG. 9 shows a simplified side view in which only a single row of the three-dimensional protrusions 71a-71d is illustrated. In addition, FIG. 9 shows a further method step of this embodiment. Accordingly, the step of applying the hydrophobic coating 14 includes that the hydrophobic coating 14 is applied to the projecting three-dimensional protrusions 71a-71d. Obviously, this is does not exclude that the hydrophobic coating 14 may also be deposited in the gaps between the three-dimensional protrusions 71a-71d on the first and/or second side 11, 12 of the substrate 10, as illustrated.

FIG. 10 shows a further method step of this embodiment. Accordingly, the step of removing the photoresist 13 includes that the photoresist 13a-13d including the hydrophobic coating 14 located thereon is removed from the surface of the projecting three-dimensional protrusions 71a-71d. Thus, the surface of the three-dimensional protrusions 71a-71d is again exposed. The three-dimensional protrusions 71a-71d, or their exposed surfaces, may comprise hydrophilic characteristics.

As initially mentioned, the individual optical microlenses 16a-16d are arranged on the surfaces of the three-dimensional protrusions 71a-71d. For example, the individual microlenses 16a-16d may be printed onto the surfaces of the three-dimensional protrusions 71a-71d by means of inkjet printing methods, as is shown in FIG. 1G. Thus, individual drops of optical material are applied to the surfaces of the three-dimensional protrusions 71a-71d.

The advantage of the three-dimensional protrusions 71a-71d is that the surrounding edges 101 of the surfaces of the three-dimensional protrusions 71a-71d make the printed drops stay on the surfaces of the three-dimensional protrusions 71a-71d due to the surface tension so that they do not flow down.

This effect is additionally amplified if the three-dimensional protrusions 71a-71d, or the surfaces of the three-dimensional protrusions 71a-71d, comprise hydrophilic characteristics.

As can further be seen in FIG. 10, the hydrophobic coating 14 located in the gaps between the three-dimensional protrusions 71a-71d remains.

According to some embodiments, the substrate 10 may be translucent at least at the predetermined locations 15a-15f where the one optical microlens 16a-16f each is to be arranged. This is particularly advantageous if there is a light source that is to shine through the substrate 10.

Furthermore, the description with respect to FIGS. 1A to 10 also applies to embodiments where the individual microlenses 16a-16f are arranged either only on the second side 12 of the substrate 10 or also on both sides 11, 12 of the substrate 10.

Figure 11A:
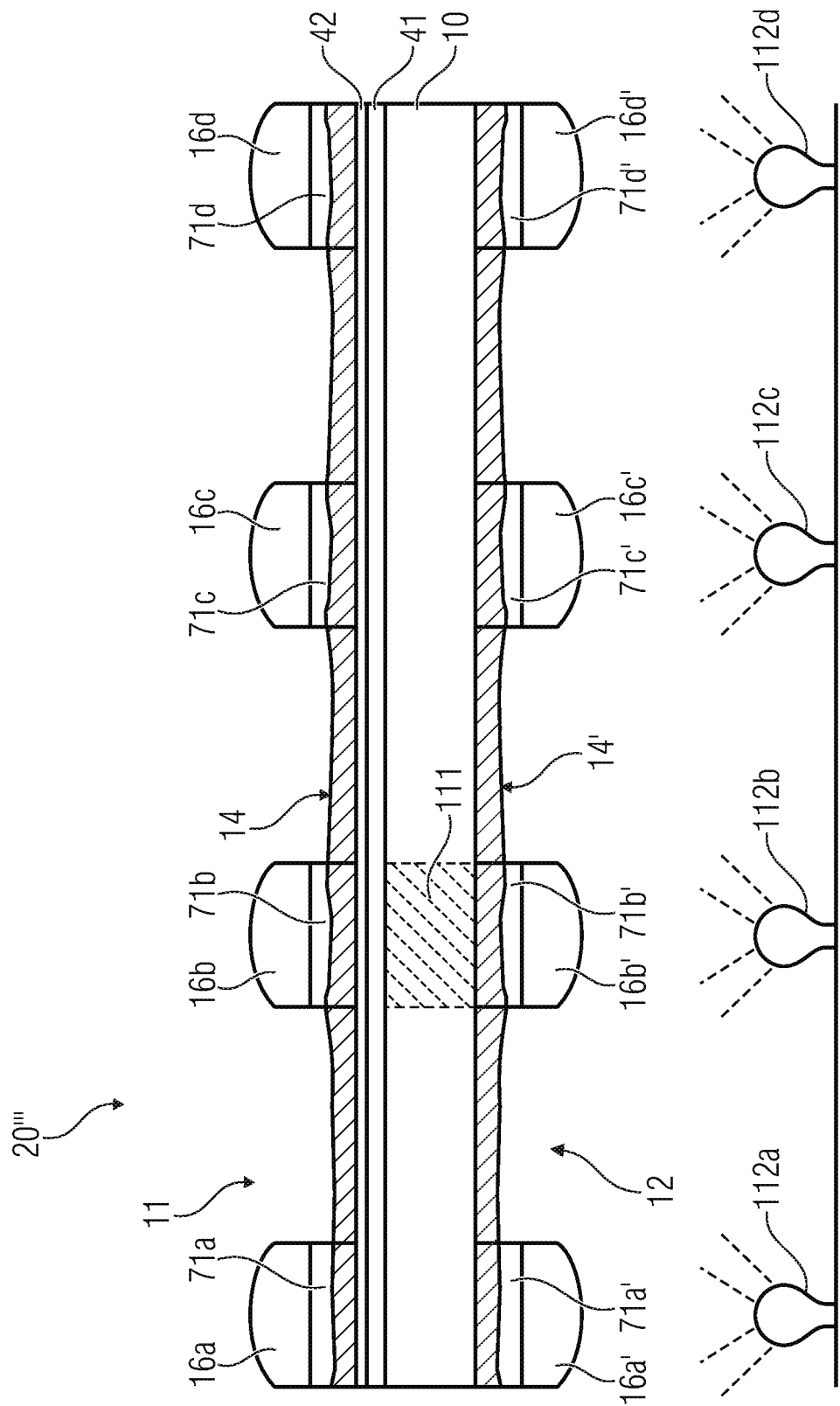
FIG. 11A shows a side view of another embodiment of an inventive microlens array
Figure 11B:
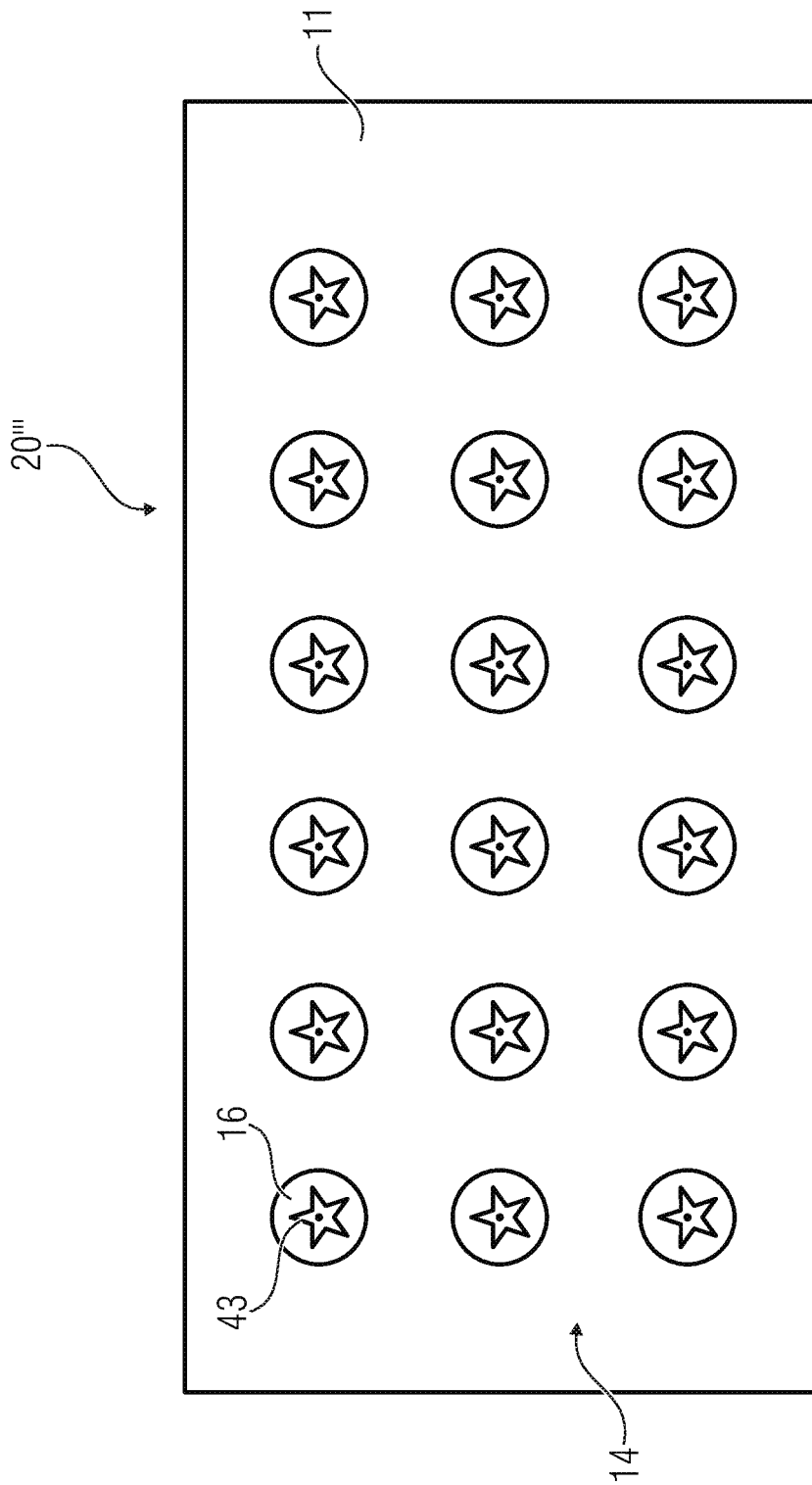
FIG. 11B shows a top view of this microlens array.

FIGS. 11A and 11B show a side view and a top view, respectively, of a further embodiment of an inventive microlens array 20''' with microlenses 16a-16d, 16a'-16d' arranged on both sides on three-dimensional protrusions 71a-71d, 71a'-71d' in combination with shadow masks, or slides, 43 that may be backlit.

At the locations where the one optical microlens 16a-16f each is arranged, the substrate 10 comprises a translucent portion 111 that extends through the substrate 10 from the first side 11 to the second side 12. However, the substrate 10 may also consist entirely of transparent material.

A metal layer 41 is arranged on the first side 11 of the substrate 10. The slides 43 are formed in the metal layer 41. A further translucent SiO$_2$ layer 42 is arranged above the metal layer 41.

In addition, three-dimensional protrusions 71a-71d are arranged on the first side 11 of the substrate 10, namely on the further SiO$_2$ layer 42. One microlens 16a-16b each is arranged on the surfaces, or top sides, of the three-dimensional protrusions 71a-71d.

In addition, a hydrophobic coating 14 is applied on the first side 11 of the substrate 10. The hydrophobic coating 14 extends across the entire first side 11 of the substrate 10. In this case, the hydrophobic coating 14 is arranged on the SiO$_2$ layer 42. In addition, the hydrophobic coating 14 is located in the gaps between the individual three-dimensional protrusions 71a-71d and surrounds the three-dimensional protrusion 71a-71d at least in portions.

Three-dimensional protrusions 71a'-71d' are arranged on the second side 12 of the substrate 10 directly on the surface of the substrate 10. One microlens 16a'-16d' each is arranged on the surfaces, or top sides, of the three-dimensional protrusions 71a'-71d'.

In addition, a hydrophobic coating 14' is applied on the second side 12 of the substrate 10. The hydrophobic coating 14' extends across the entire second side 12 of the substrate 10. In addition, the hydrophobic coating 14' is located in the gaps of the individual three-dimensional protrusions 71a'-71d' and surrounds the three-dimensional protrusions 71a'-71d' at least in portions.

The inventive microlens array 20''' may be illuminated by one or several light sources 112a-112d. Advantageously, the light sources 112a-112d are located on the side 12 of the substrate 10 facing away from the slides 43. Thus, the light emitted by the light sources 112a-112d shines through the microlenses 16a'-16d' arranged on the second side 12 of the substrate 10 and through the substrate 10. The light then hits the backside of the slides 43, which are therefore backlit. The light passed through the slides 43 exits through the microlenses 16a-16b arranged on the first side 11 of the substrate 10.

When applying the photoresist 13 onto the first and/or second side 11, 12 of the substrate 10, particularly when applying the photoresist 13 onto the three-dimensional protrusion 71a-71d, the photoresist 13 may sometimes not be applied exactly onto the surfaces of the three-dimensional protrusions 71a-71d.

Figure 12C:
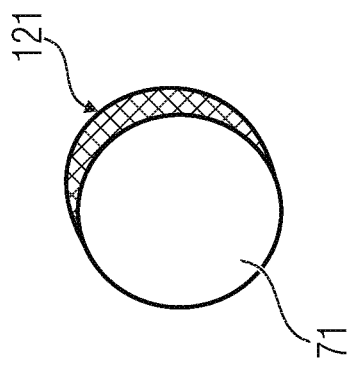
FIG. 12C shows a top view of this three-dimensional protrusion.
Figure 12B:
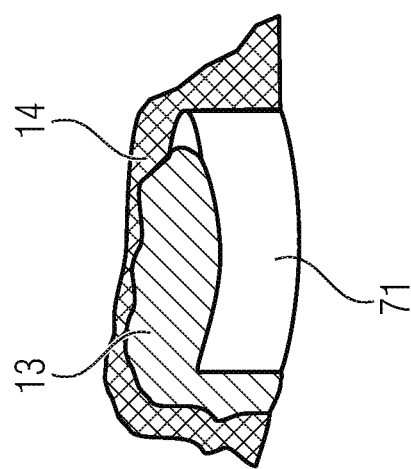
FIG. 12B shows another side view of this three-dimensional protrusion.
Figure 12A:
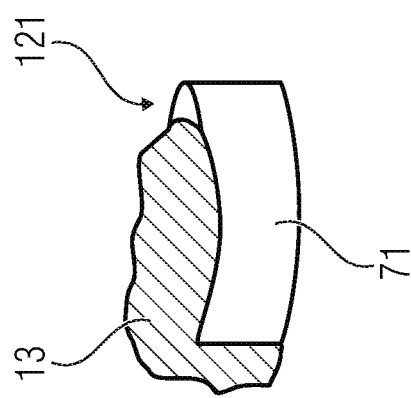
FIG. 12A shows a side view of a three-dimensional protrusion to be used for an inventive microlens array.

This is illustrated in FIGS. 12A, 12B and 12C. FIGS. 12A and 12B show a side view of a three-dimensional protrusion 71. FIG. 12C shows a top view of the top side of the three-dimensional protrusion 71.

FIG. 12A shows how the photoresist 13 is not exactly applied to the top side of the three-dimensional protrusion 71. While a spot 121 of the surface remains uncoated on the right side of the image, the photoresist 13 runs down on the left side of the three-dimensional protrusion 71.

When subsequently applying the hydrophobic coating 14 (FIG. 12B), the hydrophobic coating therefore also covers the spot 121 of the surface of the three-dimensional protrusion 71 that is not covered by the photoresist 13.

When subsequently removing the photoresist 13 including the hydrophobic coating 14 located thereon (FIG. 12C), now the hydrophobic coating 14 adheres to the spot 121 that was previously not covered by the photoresist 13.

The above-described effect may be selectively used, for example, by only coating certain spots of the surface of the three-dimensional protrusions 71 with the photoresist 13.

Figure 13:
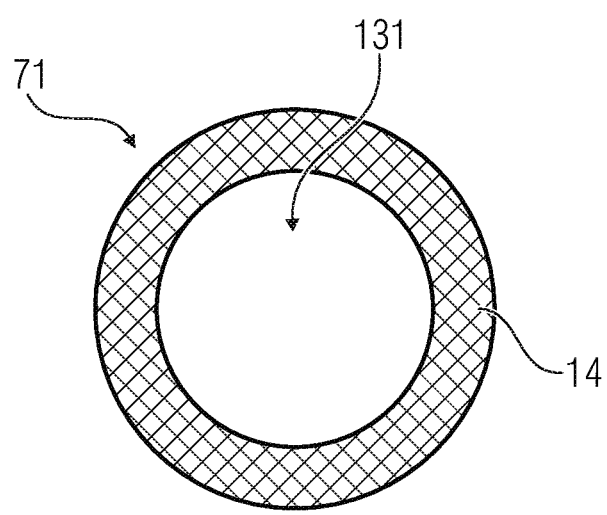
FIG. 13 shows a top view of a three-dimensional protrusion to be used for an inventive microlens array.

FIG. 13 shows a top view of a three-dimensional protrusion 71 according to an above-mentioned embodiment. Starting from the outside radially towards the inside, a region of a hydrophobic coating 14 can be seen. In the interior of this circular hydrophobic coating 14, a region 131 without hydrophobic coating can be seen.

This indicates that the region 131 was previously covered with the photoresist 13, wherein the photoresist 13 including the hydrophobic coating 14 located thereon was removed.

The circular hydrophobic coating 14 at the edges of the three-dimensional protrusion 71 shown in FIG. 13 may be used so that, for example, droplets ejected during inkjet printing run down from the hydrophobic edge 14 into the center 131 of the three-dimensional structure 71. This effect is amplified if the region 13 that is not covered by the hydrophobic coating 14 comprises hydrophilic characteristics.

According to the above-mentioned embodiments, the hydrophobic coating 14 covers the surface of at least one of the three-dimensional protrusions 71 that is spaced apart from the substrate 10 at least in portions.

Figure 14:
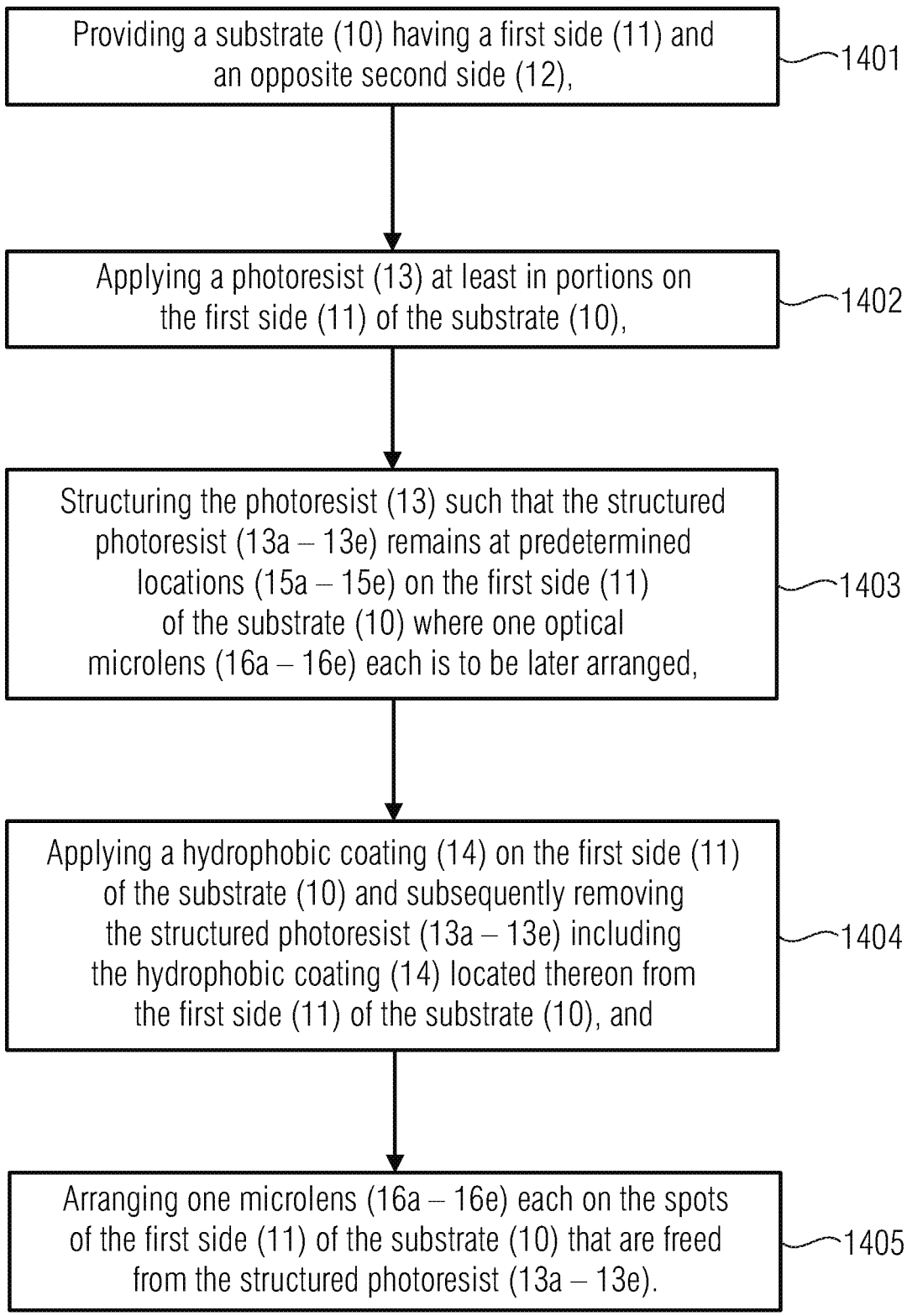
FIG. 14 shows a block diagram of an inventive method.

FIG. 14 shows a summary of the inventive method based on a block diagram.

In block 1401, a substrate 10 having a first side 11 and an opposite second side 12 is provided. In block 1402, a photoresist is applied to the first side 11 of the substrate 10 at least in portions.

In block 1403, the photoresist 13 is structured such that the structured photoresist 13a-13e remains at predetermined locations 15a-15e on the first side 11 of the substrate 10 where one optical microlens 16a-16e each is to be later arranged.

In block 1404, a hydrophobic coating 14 is applied to the first side 11 of the substrate 10 and the structured photoresist 13a-13e including the hydrophobic coating 14 located thereon is subsequently removed from the first side 11 of the substrate 10.

In block 1405, one microlens 16a-16e each is arranged on the spots of the first side 11 of the substrate 10 that are freed from the structured photoresist 13a-13e.

The following summarizes the present invention in a short form.

Among other things, the invention relates to a method for printing microlens arrays (MLA) 20, 20', 20'', 20''' as well as individual lenses 16a-16f (on both sides, large substrates, free shapes are also possible, etc.)

Conceivable embodiments are:
combination with slide 43 (metal layer or glass) 4 more complex systems such as projectors are possible
combination with LCOS
double-sided MLA (goes beyond plano-convex lens arrays)
appropriate for large substrates since there is no stamping dye but a print head that runs on a track and may therefore serve larger areas
(For wafer-level lenses, i.e., Wafer Level Optics (WLO), a more accurate positioning system would be needed to be able to mold precisely. With the inventive method (wetting structures), one can work relatively precisely with a printing device that is not so precise.)
multi-stage process for free-forms
   1st step: via the lithographically generated wetting structures
   2nd step: print further structures
high precision of the output lens is possible, higher than in printing without wetting structures. Additional optical functional elements may be printed onto the wetting structures.
layer thickness in the range of 10 µm to 200 µm
lens diameter, e.g., 50 µm to 2 mm
substrate material: glass, polymers
dosage is not only possible via printing (digital printing=inkjet method, micro pump), but also via other dosage methods via a dosage valve (certain volume for a certain time)
manufacturing wetting structures lithographically
hydrophobization either from the gas phase or from the liquid phase The inventive method has the following advantages:
complex molding processes are not necessary (no stamping tools necessary anymore)
advantage of inkjet: volume may be controlled very well (individual drops are small compared to the volume of a lens), positioning accuracy of the printing system does not necessarily have to correspond to the desired position tolerance of the individual lenses
low device expenditure, high positioning accuracy of the device is only decisive during the lithography step
"exactly the right volume is applied at the approximately right spot"
projectors: manufacturing of slides involves lithography→lithography step for wetting structures does not require special equipment (in contrast to molding—here stamp)
non-contact dosage/printing is possible, no damage or detachment of the lenses during processing (in particular when demolding)
individual lenses are separated from each other, continuous layer is not required (is needed when molding to prevent a shrinkage)→higher thermal stability
in molding, thermal weak spots are formed via the remaining "ridges" between the molded lenses since damage may impair the properties of the lenses when the individual lenses are separated from each other by a sawing, The photoresist layer 13 may comprise a layer thickness 100 nm to 5 µm.

The individually structured photoresist portions 13a-13e (FIG. 1C) may comprise a diameter of 790 µm. The surfaces of the three-dimensional protrusions 71 may also comprise a diameter of 790 µm.

The microlens 16 may comprise a lens pitch of 797 µm.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for manufacturing an optical microlens array, wherein the method comprises:
providing a substrate comprising a first side and an opposite second side,
providing three-dimensional protrusions projecting from a substrate surface of the first side of the substrate, wherein these projecting three-dimensional protrusions are provided at predetermined locations where optical microlenses are to be later arranged,
applying a photoresist to the first side of the substrate and to the projecting three-dimensional protrusions,
structuring the photoresist, wherein the structured photoresist remains at the projecting three-dimensional protrusions on the first side of the substrate where the optical microlenses are to be later arranged, and wherein the photoresist is removed at locations where no optical microlenses are to be later arranged,
applying a hydrophobic coating to the first side of the substrate and to the structured photoresist arranged on the projecting three-dimensional protrusions,
subsequently removing the structured photoresist together with the hydrophobic coating from the projecting three-dimensional protrusions, wherein the hydrophobic coating that is located in gaps between the three-dimensional protrusions remains, and
arranging one microlens each on the projecting three-dimensional protrusions that are freed from the structured photoresist and the hydrophobic coating.

2. The method according to claim 1, further comprising:
applying a photoresist to the second side of the substrate,
structuring the photoresist, wherein the structured photoresist remains at predetermined locations on the second side of the substrate where microlenses are to be later arranged,
applying a hydrophobic coating to the second side of the substrate and subsequently removing the structured photoresist together with the hydrophobic coating from the second side of the substrate, and
arranging one microlens each on spots of the second side of the substrate that are freed from the structured photoresist and the hydrophobic coating.

3. The method according to claim 1, wherein, before applying the photoresist, a metal layer is arranged on the first or the second side of the substrate and is optionally structured, and a further layer of a translucent material is arranged on the metal layer, wherein the photoresist is then applied to this further layer of a translucent material.

4. The method according to claim 3, wherein structuring the metal layer comprises partially and locally removing the metal layer so that a structure being configured to be backlit is provided in the metal layer.

5. The method according to claim 3, wherein the metal layer is arranged on the substrate such that a structured part of the metal layer is located at the predetermined locations on the first side or the second side of the substrate where the microlenses are to be later arranged.

6. The method according to claim 1, wherein the projecting three-dimensional protrusions comprise a height between 50 nm and 5 μm.

7. The method according to claim 1, wherein the projecting three-dimensional protrusions are configured as at least one of cylindrical and transparent pedestals.

8. The method according to claim 7, wherein the pedestals comprise a diameter between 50 μm and 2 mm.

9. The method according to claim 1, wherein the substrate is translucent at least at the predetermined locations where the optical microlenses are to be arranged.

10. The method according to claim 1, wherein the microlenses are printed in droplets by means of an inkjet printing method for an optical material on at least one of the first and the second side of the substrate.

11. A microlens array comprising:
a substrate that is translucent at least in portions and comprises a first side and an opposite second side,
wherein, at least on one of the first side and the second side of the substrate, a multitude of three-dimensional protrusions projecting from a respective substrate surface of the first side or the second side of the substrate is arranged,
wherein one microlens each is formed on each of the three-dimensional protrusions projecting from the substrate,
wherein the three-dimensional protrusions are spaced apart to form gaps between the three-dimensional protrusions, and
wherein a hydrophobic thin film coating is provided only on a top surface of said gaps, said hydrophobic thin film coating being a different material composition than the each microlens and serving to prevent the formation of any microlens in said gaps.

12. The microlens array according to claim 11, wherein the hydrophobic coating also covers, at least in portions, a surface of at least one of the three-dimensional protrusions projecting from the substrate.

13. The microlens array according to claim 11, wherein a metal layer and a transparent layer are arranged between the three-dimensional protrusions and the substrate, wherein the metal layer is arranged on the substrate and the transparent layer is arranged on the metal layer, and wherein the hydrophobic coating is located on the transparent layer.

14. The microlens array according to claim 13, wherein the metal layer comprises at least one recess underneath a three-dimensional protrusion.

* * * * *